United States Patent
Pati et al.

(10) Patent No.: US 12,506,812 B1
(45) Date of Patent: Dec. 23, 2025

(54) DATA POPULATION FOR ADDED SERVICES

(71) Applicant: Amazon Technologies, Inc., Seattle, WA (US)

(72) Inventors: Dibyajyoti Pati, Milpitas, CA (US); Emanuele Coviello, La Jolla, CA (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 18/616,949

(22) Filed: Mar. 26, 2024

(51) Int. Cl.
*G06F 13/00* (2006.01)
*H04L 9/40* (2022.01)
*H04L 67/51* (2022.01)
*H04L 67/568* (2022.01)

(52) U.S. Cl.
CPC ............. *H04L 67/51* (2022.05); *H04L 63/10* (2013.01); *H04L 67/568* (2022.05)

(58) Field of Classification Search
CPC ........ H04L 67/51; H04L 63/10; H04L 67/568
USPC ......................................... 709/223, 220–222
See application file for complete search history.

(56) References Cited

U.S. PATENT DOCUMENTS

| | | | |
|---|---|---|---|
| 6,199,099 B1* | 3/2001 | Gershman | G06F 16/9537 709/201 |
| 10,824,690 B2* | 11/2020 | Knight | H04L 67/306 |
| 11,762,912 B2* | 9/2023 | Van Dusen | G06F 16/90335 705/300 |
| 2013/0167048 A1* | 6/2013 | Viol | G06F 8/36 715/762 |
| 2018/0276226 A1* | 9/2018 | Knight | H04L 67/306 |
| 2022/0027416 A1* | 1/2022 | Van Dusen | G06F 16/90335 |

* cited by examiner

*Primary Examiner* — Kenneth R Coulter
(74) *Attorney, Agent, or Firm* — Athorus, PLLC

(57) ABSTRACT

Described are systems and processes for generating personalized content for a user upon cold start of an additional service by leveraging first user data having user consent for a first service and providing substitute data for the user for a second service where the user has no second user data or does not provide consent for use of the second user data. The first user data and the substitute data are input to a content model that may be trained in part with some null values. The content model generates personalized content for the additional service. The personalized content may be cached and retrieved, in part, after the user initiates use with the additional service. The personalized content may be presented to the user based on information from the first user data to create a personalized presentation of at least a portion of the cached personalized content.

20 Claims, 7 Drawing Sheets

DATA POPULATION FOR ADDED SERVICES

BACKGROUND

When a new user joins a service, the user often desires to be provided with interesting content that is personalized or customized for the user. To provide personalized and customized data, providers often rely on the user to make customizations and personalize content based on user interaction history obtained from the user that interacts with the service. However, when a user initiates or joins a new service, the user often receives generic content that lacks personalization.

Some organizations capture information about users, such as location information, user preferences, user interaction data, and other types of user data. Regulations may prevent these organizations from sharing this information with other organizations or even among other divisions, subsidiaries, or businesses owned or controlled by the same organization unless consent is obtained.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
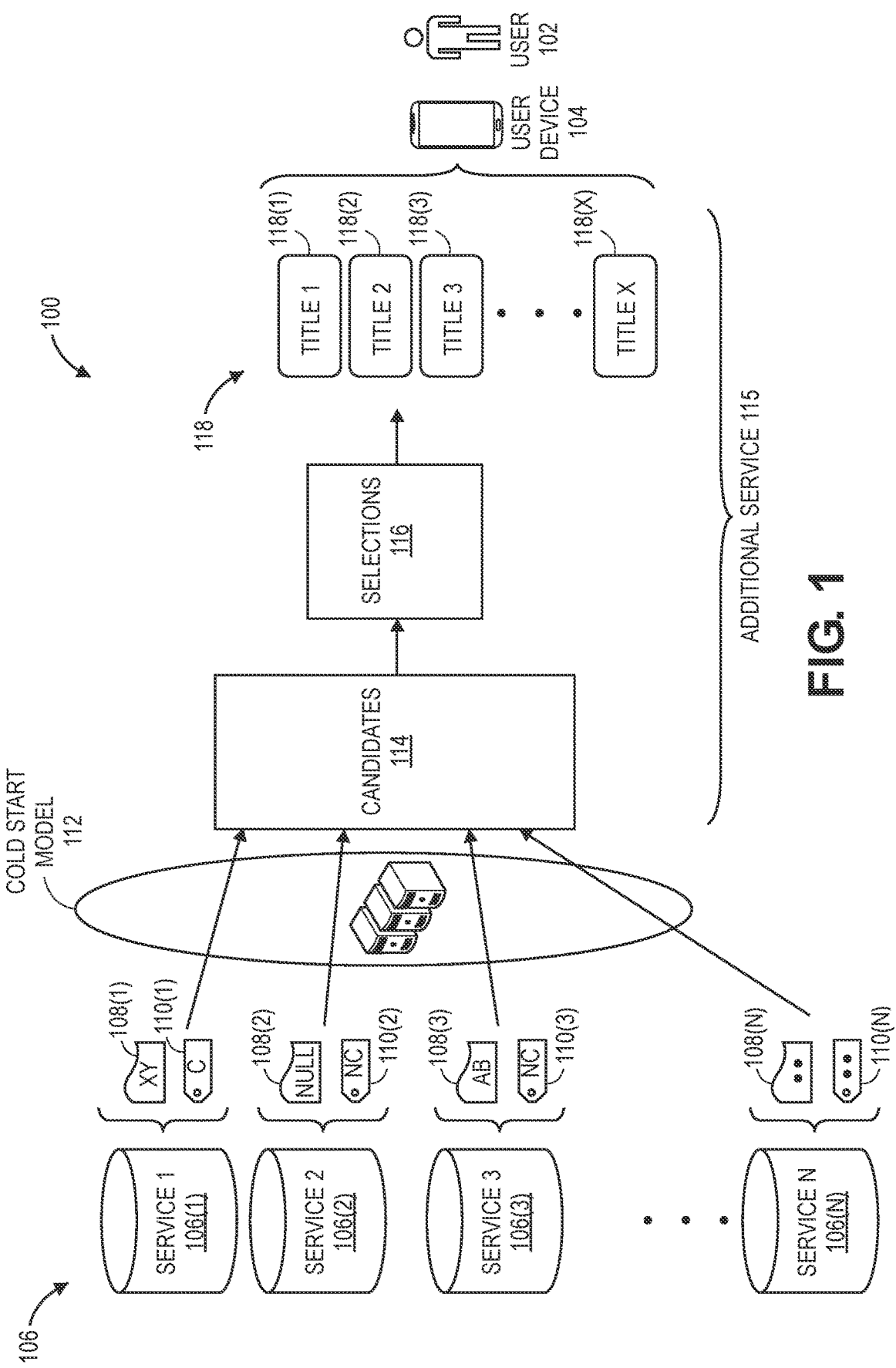
FIG. 1 is a schematic diagram of an illustrative environment to provide data for an additional service using existing services data that includes user consent, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes creation of personalized data for a cold start by a user that initiates use of an additional electronic service provided by an entity, such as joining a music service that offers access to titles in a music catalog. When a user joins an additional service, the provider or entity may desire to provide content to the user without waiting for the user to search for content. For example, the provider may desire to provide personalized suggested content, content recommendations, and/or other information that may be of interest to the user, and thus personalized for that user. Often, providers would like to customize this information, when possible, based on any known information about the user, such as any information captured during user registration, historical user data, or any other data known about the user. While some of these types of data may exist, not all data about a person can be utilized due to regulations, such as privacy regulations, that restrict how data can be used absent consent from the user. When consent has not been given for use of data from a particular data source, substitute data may be used to enable generation of meaningful data for the user during a cold start (i.e., initial use of a service that has no user history from use of that service by the particular user).

In accordance with embodiments, a cold start model (also referred to herein as a "CS model" or "content model") may be trained using user data from multiple data sources. For example, user data may be available from user interaction with an electronic marketplace (e.g., shopping history, purchases, views, page visits, etc.), social media sites, content steaming services (e.g., music, video, stories, podcasts, etc.), reading content (electronic books, media articles, etc.), and other sources or services. Some of these sources/services may share a common entity that may desire to leverage this user data from multiple sources/services to provide better personalized data for a cold start of a particular user that initiates use of an additional service.

The CS model may be trained to receive data from multiple sources. As an example, the sources/services may be a retail service and a video service. In this example, the CS model may be trained to provide music data (e.g., artists, titles, etc.) for a user that is new to the music service and that also has interacted with the retail service and/or the video service. During training of the CS model, some of the training data may intentionally be replaced with null values. This technique allows the CS model to process input data that also includes null values and still provide meaningful content to a user that is personalized based on captured user data about the user, where the captured user data includes consent for use from the user in accordance with applicable regulations, etc.

Continuing the above example, a fictitious user named "Jenny" may consent to use of retail data from the retail service but may not consent to use of the video data from the video service that Jenny interacts with from time to time. Meanwhile, the CS model may be trained using both the retail data from many users and the video data from many users, while being correlated with music preferences of users for a music service. The music service may anticipate that Jenny may join the service. The CS model may process data that Jenny has consented for use, such as the retail data, and may use substitute data (e.g., null data or other data) for data that lacks consent from Jenny, such as the video data. If Jenny has no data from a service used by the CS model, substitute data may also be used for that service. The CS model may output cached personalized content for Jenny that is different from content generated for other users. Some of the cached personalized content may be provided to Jenny as personalized data when Jenny initiates use of the music service (i.e., as a cold start). Some of this personalized content may be provided to Jenny via other distribution mechanisms, such as via advertising to Jenny via the retail service, a trial offer with the music service, marketing for the music service, and so forth. The personalized data may be suggested content, content recommendations, presentation features of content (e.g., arrangement of content in user interface, etc.), and so forth as discussed in further detail herein.

In some embodiments, the music service may later seek consent from Jenny for use of the video data or other user data from other services used by Jenny to update and improve the cached personalized data via use of the CS model. The CS model may be updated over time and the cached personalized data may be updated from time to time in anticipation of access by Jenny via the music service.

In some instances, a user may not interact with a service that provides data for the CS model. In the example above, Jenny may not use the video service and therefore may have no video data. The CS model may be used in a similar way to when Jenny does not provide consent for use of the video data and may again use substitute values in place of the video data when a user does not have video data.

FIG. 1 is a schematic diagram of an illustrative environment 100 to provide data population for an additional service using existing services data that include user consent, according to an implementation. The environment 100 may include a user 102 that interacts with electronic data via a user device 104. The electronic data may include data from various services 106. The services 106 may include services that are provided in part by a same entity or provider, co-owned, or otherwise affiliated to enable sharing of data after consent by a user associated with the data. The services 106 may include a first service 106(1), a second service 106(2), a third service 106(3), . . . and a last service 106(N). More or fewer services may be included in the environment 100. Each service may be associated with a different business and/or different electronic data. For example, the first service 106(1) may be an electronic marketplace that captures first user data in response to interaction with the electronic marketplace, items consumed via the marketplace, reviews, and/or other data captured from user interaction with the service. The second service 106(2) may be a video streaming service that captures second user data in response to interaction with the video streaming service, content watched, user feedback, and so forth. However, the services 106 may be virtually any type of service that captures user data, such as electronic marketplaces, social media sites, financial sites, content distribution services (e.g., music, video, stories, podcasts, etc.), reading content services (electronic books, media articles, etc.), mobile applications (or "apps"), or any other type of electric data service(s).

The user 102 may have interaction history with some of the services 106 and as a result may have generated some data, such data 108(1), 108(2), 108(3), . . . 108(N). Some of the data may be null, such as data 108(2), such as when the user 102 does not use or engage with the associated service (e.g., the service 106(2) shown in FIG. 1). Meanwhile, the services 106 may include a consent indicator 110(1), 110(2), 110(3), . . . 110(N) (e.g., metadata, tags, or other information) that indicates whether the user 102 has provided consent for use of the user data for that service for other purposes. For example, the user 102 may provide consent indicated in the consent indicator 110(1) for the data 108(1) but may not provide consent (e.g., no consent or "NC") as indicated in the consent indicator 110(2) for the data 108(2) and 110(3) for the data 108(3). The consent indicator 110(1)-(N) may be created to comply with regulations for consent, including documentation for the consent, terms of use of associated data, and the like.

In accordance with various embodiments, a cold start model (also referred to herein as "CS model" or "content model") 112 may be trained and used to process data from the services 106 that includes consent from the user to generate personalized content for an additional service 115. In the example shown in FIG. 1, the CS model 112 may use the data 108(1) associated with the consent indicator 110(1) indicating consent but may not use the data 108(3) associated with the consent indicator 110(3) indicated as no consent. The CS model 112 may use substitute data instead of the data 108(3) when running the CS model 112. The substitute data may be used when no user data associated with the user 102 is available from a source (e.g., the data 108(2) indicated as null) or when no consent is given by the user 102 to use the data (e.g., shown by the consent indicators 110(2) and 110(3) indicating no consent). The CS model 112 may process the data to generate candidates 114. The candidates 114 may include content associated with the additional service 115 that may not include user data, at least not until the user 102 begins to interact with the additional service 115. The content included in the candidates 114 may be suggested content, content recommendations, and/or other information that may be of interest to the user and that pertains to the additional service 115. The candidates 114 may be referred to herein as personalized data or cached personalized data, which may be provided to the user 102 at a later time, such as when the user 102 joins the additional service 115, or as a promotion via existing services used by the user, for example. The CS model 112 may be implemented locally with the additional service 115, or may be implemented remote from the additional service, such as in a distributed computing environment, virtually, or in other computing environments accessible via a network.

The additional service 115 may select or determine selections 116 as a subset from the candidates 114 to provide to the user 102, such as when the user 102 initiates use with the additional service 115 (e.g., as cold start data) or at other times, such as via advertising, promotion information, or via surfacing on other services of the services 106 used by the user 102. The selections 116 may include titles 118(1), 118(2), 118(3), . . . 118(X) that may be made accessible to the user 102 via the user device 104. The titles 118(1)-(X) may be associated with presentation information, which may indicate how to present the titles 118(1)-(X) to the user 102 via the user device 104, such as an order, arrangement, visual aesthetics, or other presentation features for presenting the titles 118(1)-(X) to the user in a user interface. The titles 118(1)-(X) may be associated with unique content identifiers, such as universal product codes or similar tracking codes or designators. As an example, the titles 118(1)-(X) may be suggested songs for the user 102, where the additional service 115 is a music service. The titles 118(1)-(X) may be used to retrieve corresponding songs from a music catalog provided by the additional service 115 and made to be selectable by the user 102 via the user device 104 to initiate playback of the respective songs. However, the additional service 115 may be any time of service, such as electronic marketplaces, social media sites, financial sites, content distribution services (e.g., music, video, stories, podcasts, etc.), reading content services (electronic books, media articles, etc.), mobile applications (or "apps"), or any other type of electric data service.

Figure 2:
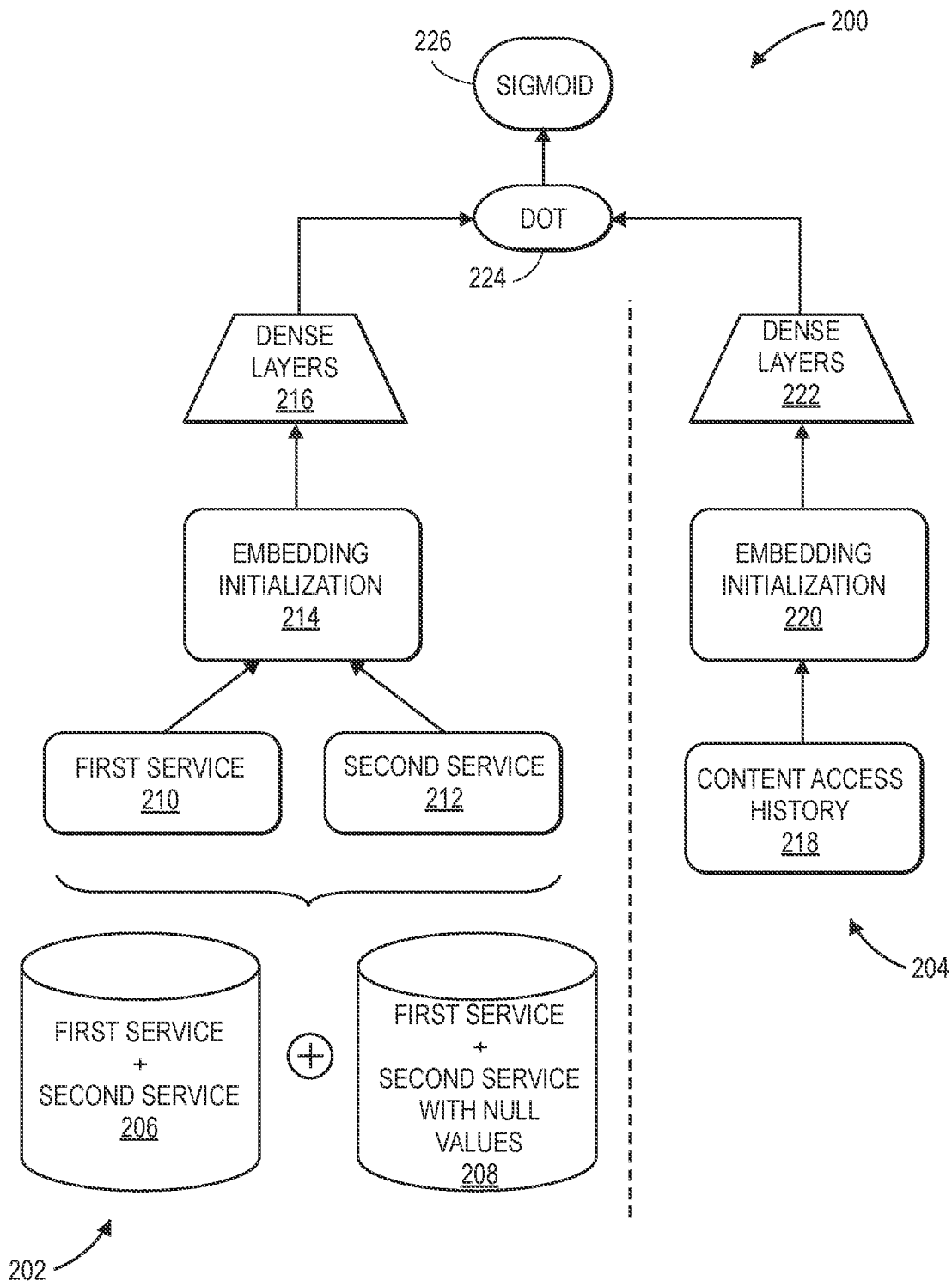
FIG. 2 is a block diagram of an example architecture to train a cold start model to provide content for an additional service, according to an implementation.

FIG. 2 is a block diagram of an example architecture 200 to train a cold start model, such as the CS model 112 shown in FIG. 1, to provide content for an additional service, such as the additional service 115, according to an implementation. In some embodiments, the CS model 112 may utilize a two-tower architecture to provide content (e.g., data associations, content suggestions, recommendations, etc.) with a neural network. In some embodiments, the two-tower architecture may include a user tower 202 that includes features from services where the user provided consent (e.g., data 206 and 208) and an item tower 204 associated with data from the additional service (e.g., the additional service 115). The two-tower architecture may be effective for providing content recommendations, content suggestions, and other meaningful content for user consumption via the additional service. In various embodiments, a neural network with two sub-models may be used to learn representations for user features (or queries) and items (or candidates) separately. For example, the user features may be user data captured from use of different services by the user of the services 106 from FIG. 1. A score of a user-item pair may be determined as the dot product of the outputs of these two towers. This model architecture can be flexible and adapted for use with different data from the services 106. For example, user data from additional services may be used in the model architecture. In some embodiments, other machine learning models may be used to make correlations between input data from some or all of the services 106 and suggested outputs (e.g., suggested content for users of an additional service, etc.).

The CS model 112 may use a combination of sparse categorical features (e.g., user demographic information from an electronic marketplace that includes location information such as postal code, state, city etc.) and dense features such as data from an electronic content delivery service (e.g., streaming video service, etc.), which may include data such as customer title relevance (CTR) embedding, cluster representation, etc. Some or all the available features may be provided to the CS model separately and combined using dense layers 216, 222 to output a dimensional user embedding. These dense layers (or vectors) can be combined using several combinations strategies. In some embodiments, concatenation may be used as this technique can preserve embeddings, whereas a sum technique may preserve the mean values of content. In the embedding space, unique item identifiers may be used to represent the candidates that may be provided as an output to the user, such as the titles 118(1)-(X) shown in FIG. 1 and also referred to herein as cached personalized content.

In some implementations, the user tower 202 may be trained with features from a first service 210 and a second service 212 (or other features from the various services 106). In some embodiments, the features may be extracted from complete data 206 that includes the data from the first service and the second service and data with some null values 208, which may represent the complete data 206, but with some values replaced with null values. This approach creates robustness that better outputs personalized content for a user that may have user data that includes null values (e.g., due to no consent, no use of a service, or both).

Accordingly, the user tower 202 may be trained with features from the first service 210 and the second service 212 (or other features from the various services 106) to predict an embedding, via embedding initialization 214, for each user, to create dense layers 216. The embedding initialization 214 may be generated for the model (e.g., learned from scratch, random, etc.) or an existing embedding may be used or adapted from another model or service, such as the first service 210 or the second service 212. Meanwhile, the item tower 204 may be trained with content access history 218 of the additional service 115, for example, and to predict an embedding initialization 220, such as of a corresponding content item (e.g., artist) to predict an embedding vector for the content (e.g., artists) and create dense layers 222. The embedding initialization 220 may be generated for the model (e.g., learned from scratch, random, etc.) or existing embeddings (e.g., from another representation) may be used or adapted from the additional service, such as the additional service 115. However, other similar training structures may be used that provide correlations described herein. The output embeddings (e.g., dense layers 216, 222) may then be used as a dot product 224. A final output of the CS model may be obtained after applying a sigmoid activation 226, as shown in Equation 1, below.

$$X(u,i)=W^T(h_u O h_i)$$ Equation 1

In Equation 1, "O" is the element-wise product of the user and item embedding vectors ($h_u$ and $h_i$, respectively). This element-wise product may then be used for computing categorical cross-entropy loss over the entire corpus (such as an artist corpus of musical artists). The two towers may be trained for each customer-content (e.g., artist) pair in an end-to-end fashion.

In various embodiments, an approach to cold-start content generation consists of a single multi-modal model that takes as input an array of features from multiple services (e.g., the services 106). One way to serve a user that has not explicitly consented to data use from a service (e.g., from the second service 106(2)), but has consented to use of data from the first service 106(1), may be to run inference with the existing model, but with all first service features (or other services features) set to zero (i.e., null) or otherwise replaced with substitute data. Most training data (e.g., the complete data 206) inherently has some degree of missing features (e.g., null values). For example, a user may not have used some portions of one of the services 106 or may not have used the service at all but may have consumed content on a different one of the services 106. The CS model may exploit this organic distribution of features in the dataset, and specifically, how features are organically missing, might not be representative of the distribution of features of valid and useful dataset, where some features are redacted (e.g., replaced with substitute data such as null values, group data, etc.) where the user has not explicitly expressed consent on the data for a particular service or no data exists or is accessible for a service. Thus, the CS model may be trained with additional artificial samples generated by dropping groups of features at random or dropping features in other ways (e.g., the data with some null values 208), such as setting some values to null, to instill higher robustness to missing features.

The CS model may be retrained from time to time to update the CS model with new training data, new content from the additional services, and so forth. The CS model may be updated, refreshed, and/or retrained using a similar process as described above.

Figure 3:
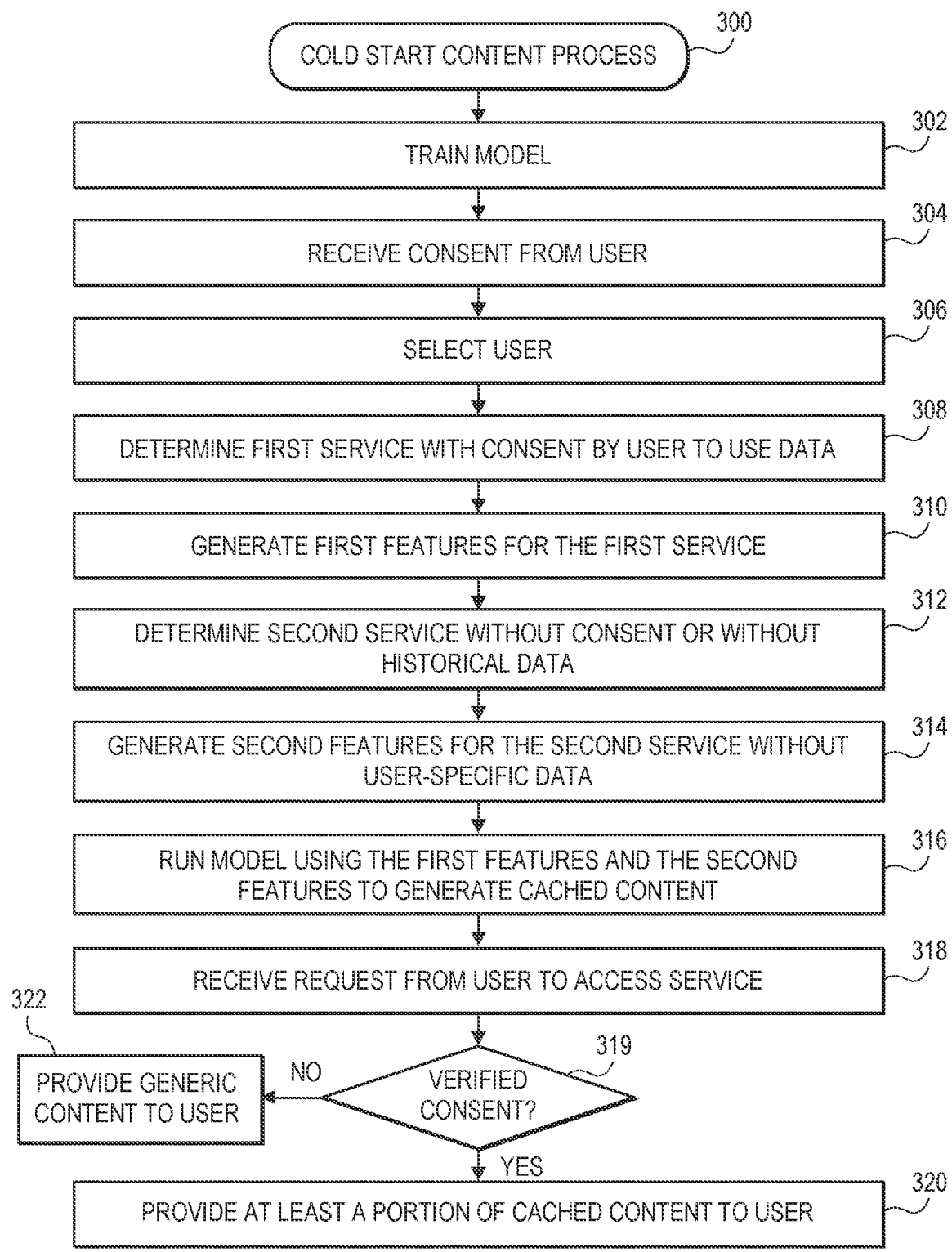
FIG. 3 is a flow diagram of an example process to provide data for an additional service using existing services data that includes user consent, according to an implementation.

FIG. 3 is a flow diagram of an example process 300 to provide data population for an additional service using existing services data that includes user consent, according to an implementation. The example process of FIG. 3 and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation and any number of the described operations can be combined in any order and/or in parallel to implement the routine. Likewise, one or more of the operations may be considered optional. Various operations from different processes may be combined in accordance with various embodiments.

The process 300 may begin by training the CS model, as in 302. The training may include use of the architecture 200 described with reference to FIG. 2. In some embodiments, the CS model may be trained using training data from a first service and a second service to create a trained CS model, wherein the training includes replacing at least some of the training data with null values to simulate missing user data in the CS model. The CS model may be trained with data from any more or fewer other services. The data used for the training may be obtained from users that provide consent for use of the data in the CS model. The CS model may be trained with correlated content access history of an additional service. Thus, once trained, the CS model may receive inputs from user data that includes consent and may provide output of personalized content that may be meaningful for the user, yet personalized and not generic or the same for most or all users.

In accordance with various embodiments, a service may receive consent from a user to allow use of certain user data for specific purposes or for general purposes, as in 304. For example, the consent may include limitations on use of the data or no limitations on use of the data. The consent may be associated with the user and the respective data that is subject to the consent. A service may obtain consent from a user by asking the user to provide consent, receiving acknowledgment from the user as consent, and so forth, in accordance to applicable regulations that govern solicitation and receipt of user consent for use of user data. In some instances, certain regulations may dictate or control how consent is requested by an entity and/or how consent is provided by a user (e.g., how documented, verified, etc.).

The consent may be provided to the service provider at a first time, possibly before the subsequent operations described below.

A user may be selected to be provided with personalized content for the additional service, as in 306. For example, the CS model, the additional service, or another entity or component may select the user as a possible candidate for use of the additional service 115. Users may be selected at random or in other ways (e.g., using a prediction model, etc.), and after a user is selected and respective user data with consent is processed accordingly, another user may be selected and that user's data may be processed in a similar manner, and so forth.

For the selected user from operation 306, a first service having user consent to use associated first data may be determined, as in 308. For example, the user selected at operation 306 may have used a first service. The first service may have captured user interaction data as first data. The user may have provided consent for use of the first data from the first service for other purposes, such as to create personalized content for the additional service. The consent may be determined by metadata, tags, or other information associated with the user and/or the first service.

First features may be generated for the first service, as in 310. The first features may only be generated when consent has been obtained. The features may be based on the user data from the first service and can be input into or otherwise used with the trained CS model, such as via the two-tower architecture described above.

For the selected user from operation 306, a second service having no user consent to use associated second data may be determined, as in 312. For example, the user selected at operation 306 may have used a second service but not provided consent for use of second data from the second service for other purposes, such as to create personalized content for the additional service. The lack of consent may be determined by metadata, tags, or other information associated with the user and/or the first service. The lack of consent may be indicated by the absence of affirmative indicia of consent.

Second features may be generated for the second service, as in 314. The second features may include substitute features, such as null values, other user's group values, or other values, but may not include or be based on actual user data associated with the user selected at operation 306 since the second data of the user lacks associated consent for use of that second data. The features may be input into the trained CS model, such as via the two-tower architecture described above. When null values are used, the features may be null values, for example.

The CS model may be executed using the first features from operation 310 and the second features from operation 314, as in 316. The CS model may be executed using these features to generate cached personalized content for the additional service, where the user selected at operation 306 does not have user history with the additional service and/or has not previously accessed the additional service.

A request may be received from the user to access the additional service, as in 318. For example, at a later time the user may decide to join, subscribe, or otherwise access the additional service. The additional service may collect at least some information to identify the user, associate the user with past information (e.g., the user data from the first service, a user identity linked to operation 306, and so forth).

The system may verify that the user consent given to generate the cached data (e.g., from operation 304) is still current and has not been revoked, as in 319. For example, a user may give consent for use of data and then may later decide to cancel or revoke this consent. If the consent is revoked, then the cached content may not be provided to the user and may be discarded. In some embodiments, revoking of consent may cause any cached content to be discarded. When the consent has been revoked and is not verified as current, following the "no" route from decision operation 319, then the user may be provided with generic content as cold start data for the additional service. The generic data may be popular titles or other common information that is not personalized for the user, since personalization is not available in this instance.

When the consent has been verified as current, following the "yes" route from the decision 319. The additional service may provide at least a portion of the cached personalized content created at operation 316 to the user, as in 320. For example, the additional service may access the cached personalized data and determine to present at least a subset of that cached personalized content to the user as personalized content to enable the user to interact with the additional service in a meaningful way to enjoy content that is relevant and likely to be enjoyed by the user based on associates provided by the CS model.

In accordance with embodiments, the process 300 may be performed from time to time for a user. For example, the process 300 may be performed each time the CS model is trained or updated, after receiving consent from the user, or at other times. Execution of the process 300 may result in different cached personalized content due to changes to the CS model during training, added user history about the user, or for other reasons as described herein.

Figure 4:
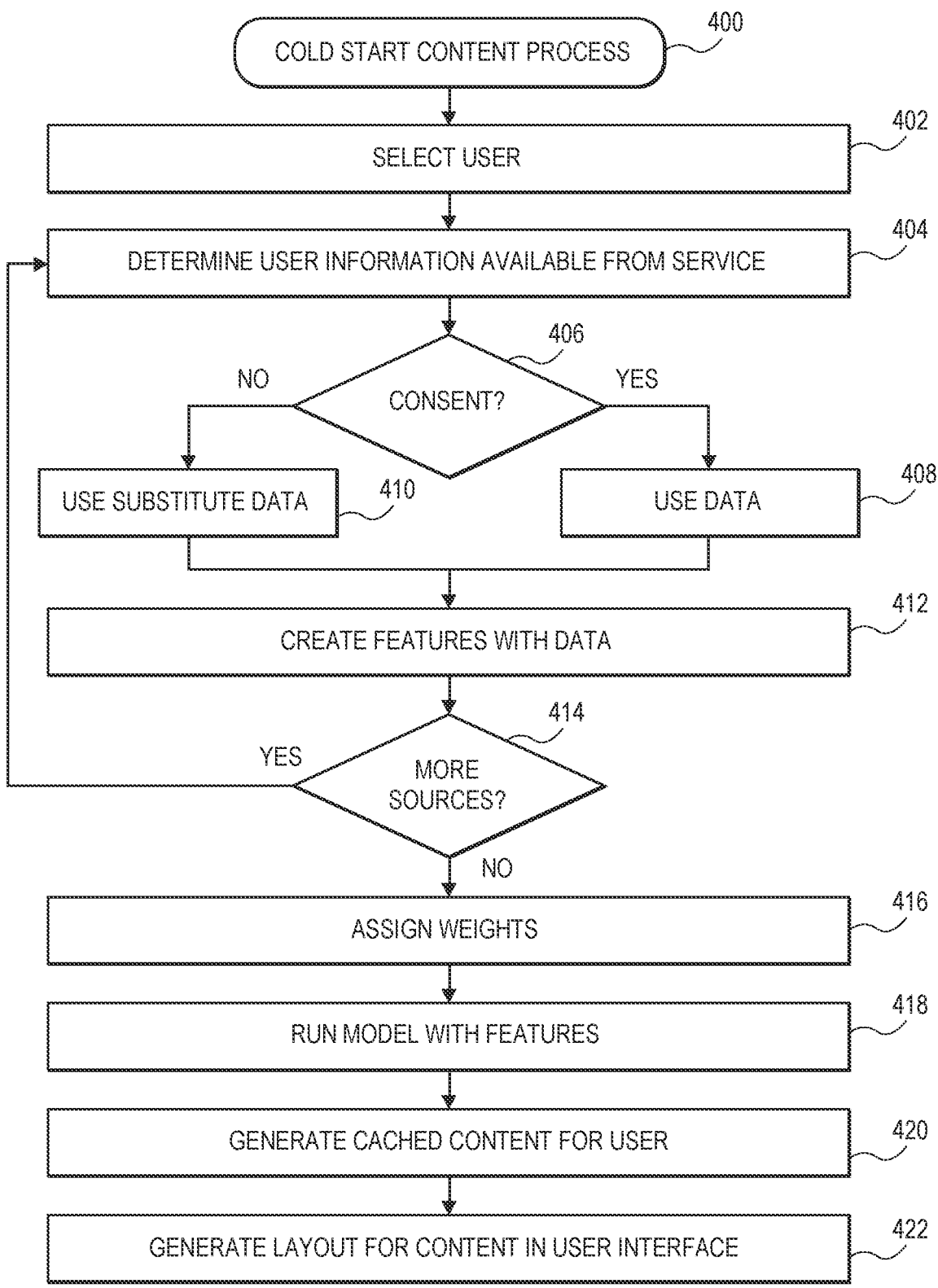
FIG. 4 is a flow diagram of another example process to provide data for an additional service using existing services data that includes user consent, according to an implementation.

FIG. 4 is a flow diagram of another example process 400 to provide data population for an additional service using existing services data, according to an implementation. The process 400 may begin by selecting a user, as in 402. The operation 402 may be performed after training of a CS model and may be similar to the operation 306 described with reference to FIG. 3. The user may be selected based on a potential association or likelihood to join or use the additional service. However, other criteria may be used or the user may be selected at random, via a rotation, or using other techniques.

In accordance with various embodiments, availability of user information about the user for a service may be determined, as in 404. For example, the user selected at operation 402 may be associated with various services that obtain data about the user and may make that user data accessible under certain circumstances, such as when the user provides consent to share the user data and when an entity (e.g., the additional service) is owned or affiliated with a provider of the other service(s). A user may have user data available in one or more services that may be used by the CS model to enable generation of cached personalized content as discussed above.

After identification of user data, a determination whether consent has been received for use of the user data for the service may be performed, as in 406. For example, a service may have captured and retained user data associated with the user selected at the operation 402. The service may provide indicia, metadata, tags, or other indications that the user has provided consent to use the user data, such as for generation of the cached personalized data for the additional service and/or for other purposes (e.g., providing advertising, recommendations, etc.). In some instances, the service may provide no indication, which may indicate no consent. Consent may be governed by regulations and proper documentation and/or verification of the consent may be obtained or verified at the decision operation 406.

When consent is associated with proper consent, following the "yes" route from the operation 406, then the user data may be used by the CS model, as in 408. In some instances, the user data, or a portion thereof, may be accessed or otherwise obtained for use. The user data may be preprocessed for use by the CS model. The preprocessing may enable expedited extraction of relevant data for processing by the CS model.

When consent is not associated with proper consent, following the "no" route from the operation 406, then substitute data may be used by the CS model, as in 410. The substitute data may be null data or other data that is not associated with the user. In some instances, the substitute data may be generated from other users' data from a portion of other users that are similar to the user and possibly linked to or associated with the user, such as associated via user data having consent by the user. The substitute data may also include user data from random users or an assigned user, among other possible sources.

Following operations 408 and 410, features may be created for use by the CS model using the data from operation 408 or operation 410, as in 412. The features may be based on user data or substitute data and can be input into or otherwise used with the trained CS model, such as via the two-tower architecture described above.

A determination whether additional services (or sources) having user data are available may be processed, as in 414. When more services are available for inspection (following the "yes" route from operation 414), the process 400 may return to operation 404 for a different service and follow the processing described above to determine consent (as in 406) and use data (as in 408 when consent is available) or use substitute data (as in 410 when consent is not available), and then create features for that service. Operation 414 may continue along the "yes" route until services have been inspected, accessed, or otherwise queried to determine if user data is present. When a user has no user data for a service, substitute data may be provided as a default since no consent would be provided since there is not data with which to provide consent. Thus, if a service is not used by the user via operation 404, process 400 may use the substitute data at operation 410 during process 400. When no more services (or sources) are available for inspection at the operation 414, then process may continue via the "no" route at operation 416.

Weights may be assigned to the features and/or services, as in 416. The weights may be used to increase or decrease the influence of respective features and/or services, such as for certain services. For example, if a user has extensive user data for a first service and minimal data for a second service, the first service may be provided a higher weight to increase an influence of the data from the first service. However, weights may be equal or not used in some implementations.

The CS model may be executed using the features from operation 412 and the weights (if any) from operation 416, as in 418. The CS model may be executed using these features to generate cached personalized content for the additional service, where the user selected at operation 402 does not have user history with the additional service and/or has not previously accessed the additional service.

Cached personalized content may be generated, as in 420. In some embodiments, the cached personalized content may be ordered, ranked, and/or pruned from a large set of results. Upon use of the additional service, at least a portion of the cached personalized data may be served to the user via the additional service as cold start data to provide a meaningful experience for the user. As the user begins to interact with the additional service, the additional service may use captured user interaction data to provide other personalized content for the user.

In some embodiments, layout information may be generated for presentation of the content in a user interface, as in 422. The layout information may be an order of presentation, a location, a size, visual aesthetics, and/or other personalized representation of the portion of the cached personalized content. The layout may be determined based on user data for the user that includes consent and provides indication of layout preferences of the user. For example, a user may prefer to see content provided with text (e.g., text listing, etc.) while using a first service. This may indicate that the user prefers a text-based layout for the personalized content for the additional service. Another user may have user history with consent indicating a preference for imagery in a layout of content, such that the personalized content may be presented as images (e.g., album artwork, etc.) for that user. Color schemes, themes, and/or other user interface preferences may be accessed for a user when consent is available and used by operation 422 to generate a personalized user interface for the user selected at operation 402.

Figure 5:
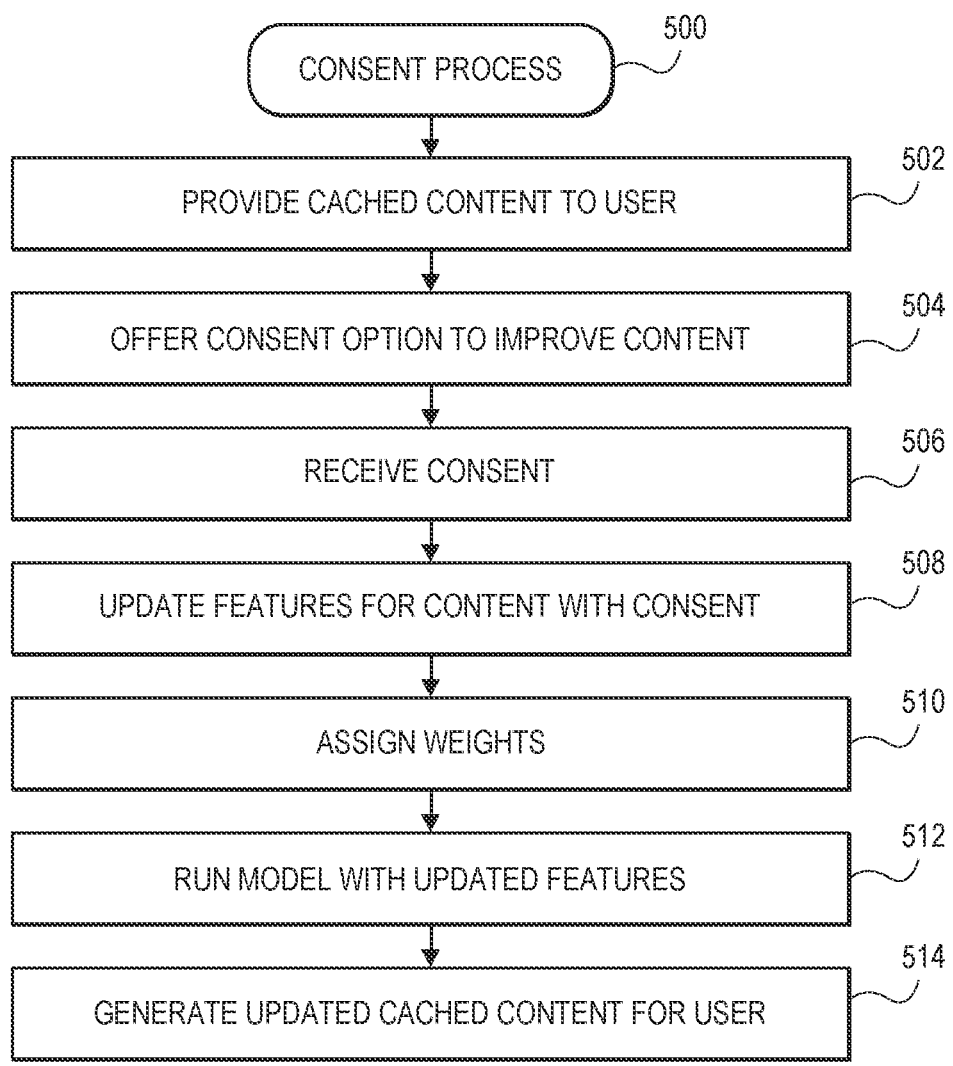
FIG. 5 is a flow diagram of an example process to obtain user consent to improve content provided for an additional service, in accordance with disclosed implementations.

FIG. 5 is a flow diagram of an example process 500 to obtain user consent to improve content provided for an additional service, in accordance with disclosed implementations. Process 500 may begin by providing at least some of the cached personalized content to the user, as in 502. For example, operation 502 may be the same or similar to operation 320 shown in FIG. 3.

The additional service, or another service, may offer an option for the user to provide consent to use other user data to improve the personalized content from operation 502, as in 504. For example, a user may have provided consent to use first user data associated with a first service but may not have provided consent to use second user data associated with a second service. The lack of consent may have been an oversight by the user or based on reasoning that is no longer relevant, among other possibilities. The user may be provided with an option to provide the consent to use the second data (or other data), and possibly provided with an explanation of benefits of this consent (e.g., provide more relevant personalized content, etc.), among other possible information provided with the option for consent. The option for consent may be provided to satisfy regulations governing consent, such as informing the user of various rights, documenting the consent, and so forth.

Consent may be received from the user, as in 506. The consent may be received to comply with regulations governing consent, including documentation requirements. The consent may be provided for limited purposes, and those purposes or conditions may be included with the consent.

After receiving consent for other user data, features may be created or updated, possibly from null values or other substitute data, as in 508. For example, when the second user data was replaced with substitute values during creation of the cached personalized content provided via operation 502, and consent was obtained to use the second user data via operation 506, then the features may be updated with information from the second user data at operation 508.

Weights may be assigned to the features and/or services, as in 510. The weights may be used to increase or decrease the influence of respective features and/or services, such as for certain services. For example, if a user has extensive user data for a first service and minimal data for a second service, the first service may be provided a higher weight to increase an influence of the data from the first service. However, weights may be equal or not used in some implementations.

The CS model may be executed using the updated features from operation 508 and the weights (if any) from operation 510, as in 512. The CS model may be executed using these features to generate updated cached personalized content for the additional service, where the user does not have user history with the additional service or has minimal user history with the additional service.

Updated cached personalized content may be generated, as in 514. In some embodiments, the cached personalized content may be ordered, ranked, and/or pruned from a large set of results. Upon additional use of the additional service, at least a portion of the updated cached personalized data may be served to the user via the additional service to provide a meaningful experience for the user. As the user continues to interact with the additional service, the additional service may use captured user interaction data to provide other personalized content for the user.

Figure 6:
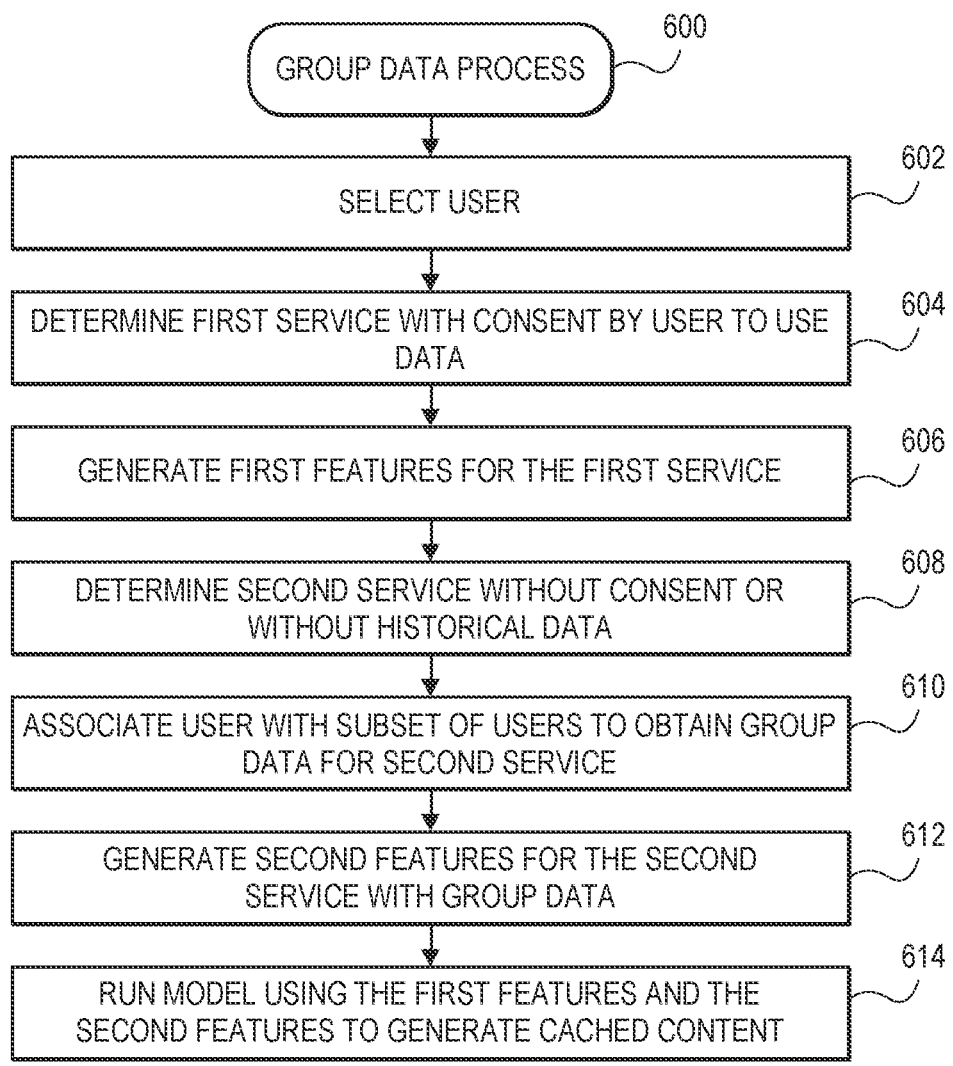
FIG. 6 is a flow diagram of an example process to create content for an additional service using group data to generate some features used by a trained model, according to an implementation.

FIG. 6 is a flow diagram of an example process 600 to create content for an additional service using group data to generate some features used by the trained CS model, according to an implementation. The process 600 may begin by selecting a user, as in 602. The user may be selected similar to the operation 306 shown in FIG. 3.

For the selected user from the operation 602, a first service having user consent to use associated first data may be determined, as in 604. For example, the user selected at the operation 602 may have used a first service and provided consent for use of first data from the first service for other purposes, such as to create personalized content for the additional service. The consent may be determined by metadata, tags, or other information associated with the user and/or the first service.

First features may be generated for the first service, as in 606. The first features may only be generated when consent has been obtained from the user. The features may be based on the user data for the first service and can be input into the trained CS model, such as via the two-tower architecture described above.

For the selected user from the operation 602, a second service having no user consent to use associated second data may be determined or having no user data may be determined, as in 608. For example, the user selected at the operation 306 may have used a second service but not provided consent for use of second data from the second service for other purposes, such as to create personalized content for the additional service. The lack of consent may be determined by metadata, tags, or other information associated with the user and/or the first service. The lack of consent may be indicated by the absence of affirmative indicia of consent. In some instances, the user may not have used the second service and, therefore, no second user data may be available for use. In some instances, no consent may indicate a lack of available data or vice versa.

The user may be associated with one or more other users (e.g., a subset of other users) to obtain group second data associated with the second service, as in 610. The association may be based on data about the user that includes consent for use for such purposes. The user may be matched with similar other users, for example, via comparison with the first data that includes the consent. The associated users may include consent to use the second data for various reasons, such as to provide personalized content for the additional service for other unidentified users, which may include the user selected at the operation 602. The second user data of the other users may be selected at random, averaged, combined, processed by another model, or otherwise used as substitute data or used to create substitute data for the user identified at the operation 602.

Second features, which may contain the group values or values of the subset of users from the operation 610, may be generated for the second service, as in 612. The second features may include the substitute features (e.g., the group data) but may not include actual user data since the second data of the user lacks associated consent for use of that data or does not exist as determined at the operation 608. The features may be input into the trained CS model, such as via the two-tower architecture described above.

The CS model may be executed using the first features from the operation 606 and the second features from the operation 612, as in 614. The CS model may be executed using these features to generate cached personalized content for the additional service, where the user selected at the operation 602 does not have user history with the additional service and/or has not previously accessed the additional service. In various embodiments, as discussed above, a request may be received from the user to access the additional service. For example, at a later time the user may decide to join, subscribe, or otherwise access the additional service. The additional service may collect at least some information to identify the user, associate the user with past information (e.g., the user data from the first service, a user identity linked to the operation 602, and so forth). The additional service may provide at least a portion of the cached personalized content created at the operation 614 to the user. For example, the additional service may access the cached personalized data and determine to present at least a subset of that information to the user as personalized content to enable the user to interact with the additional service in a meaningful way to enjoy content that is relevant and likely to be enjoyed by the user based on associates provided by the CS model. In some embodiments, layout information may be generated for presentation of the content in a user interface. The layout information may be an order of presentation, a location, a size, visual aesthetics, and/or other personalized representation of the portion of the cached personalized content. The layout may be determined based on user data for the user that includes consent and provides indication of layout preferences of the user. Color schemes, themes, and/or other user interface preferences may be accessed for a user when consent is available and used to generate a personalized user interface for the user selected at operation 602.

Figure 7:
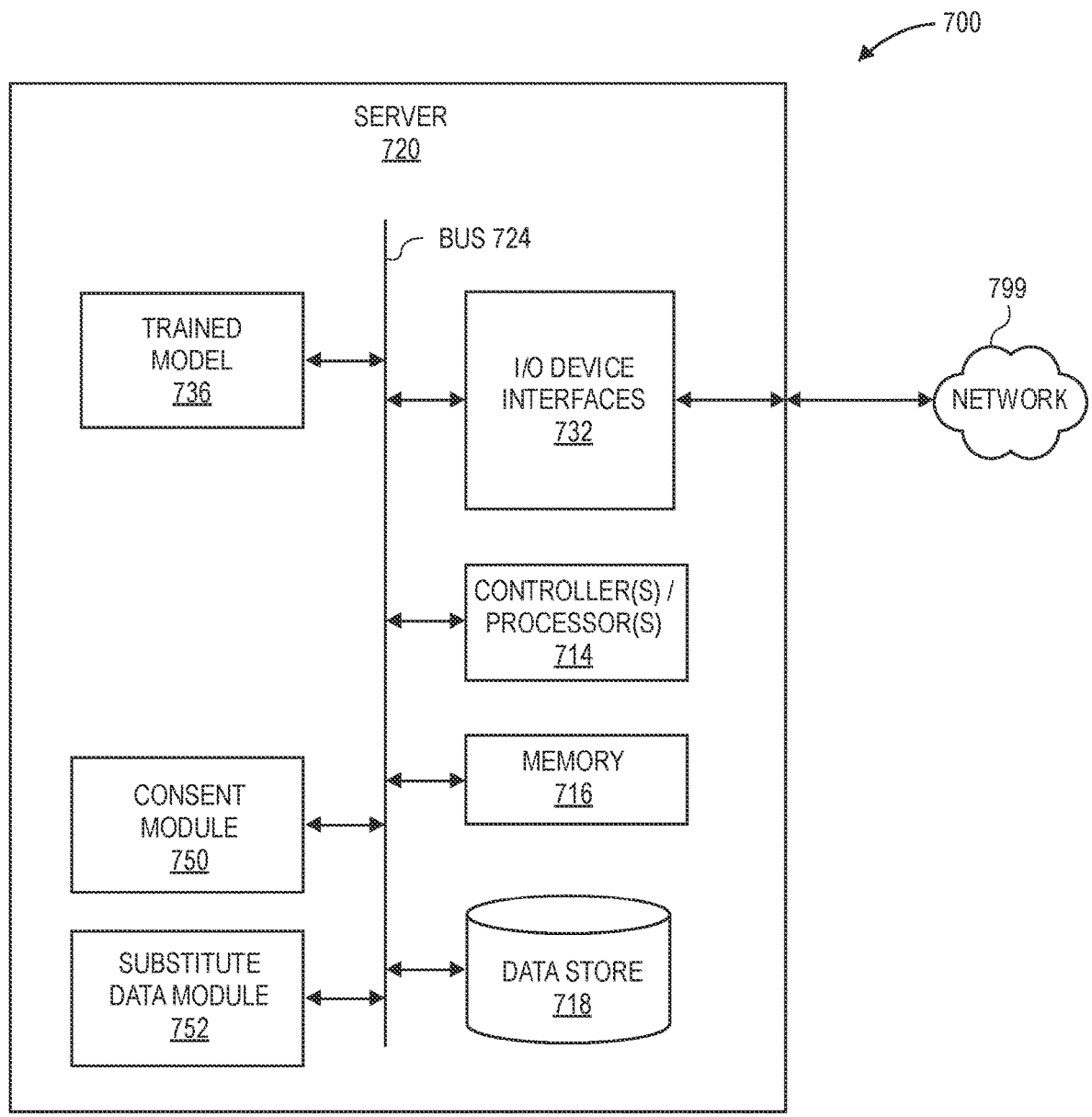
FIG. 7 is a block diagram of an illustrative implementation of a server system that may be used with various implementations.

FIG. 7 is a block diagram conceptually illustrating example components of one or more computing devices, such as a remote server 720 that may include and/or execute one or more of the above discussed implementations. Multiple such servers 720 may be included in the system.

Each of these server(s) 720 may include one or more controllers/processors 714, that may each include a central processing unit (CPU) for processing data and computer-readable instructions, and a memory 716 for storing data and instructions. The memory 716 may individually include volatile random access memory (RAM), non-volatile read only memory (ROM), non-volatile magnetoresistive random access memory (MRAM) and/or other types of memory. Each server may also include a data storage component 718, for storing data, features, weighs, user data with consent, and/or other data described herein. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 799 (e.g., the Internet) through respective input/output device interfaces 732.

Computer instructions for operating each server 720 and its various components may be executed by the respective server's controller(s)/processor(s) 714, using the memory 716 as temporary "working" storage at runtime. A server's computer instructions may be stored in a non-transitory manner in non-volatile memory 716, storage 718, and/or an external device(s). Alternatively, some or all of the executable instructions may be embedded in hardware or firmware on the respective device in addition to or instead of software.

Each server 720 includes input/output device interfaces 732. A variety of components may be connected through the input/output device interfaces. Additionally, each server 720 may include an address/data bus 724 for conveying data among components of the respective server. Each component within a server 720 may also be directly connected to other components in addition to (or instead of) being connected to other components across the bus 724. Each server may also include or have access to (e.g., via the network 799) one or more trained CS models 736. Each server may include a consent module 750 to create, maintain, and/or verify consent of user data for a respective service as discussed herein. Each service may include a substitute data module 752 to create the substitute data for use by the CS model when consent is not available for certain user data or the user data is not available. The substitute data module 752 may provide null data, group data, or other data as a substitute when actual user data cannot be used (missing or no consent). In some embodiments, the substituted data module 752 may perform some or all of the operations of the process 600 described with reference to FIG. 6 to obtain group data.

The components of the server(s) 720, as illustrated in FIG. 7, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 3, 5, and 6, orders in which such methods or processes are presented are not intended to be construed as any limitation on the claimed inventions, and any number of the method or process steps or boxes described herein can be combined in any order, in parallel, and/or be omitted to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A method, comprising:
   training a cold start model using training data from at least a first service and a second service to create a trained cold start model, wherein the training includes replacing at least some of the training data with null values to simulate missing user data in the cold start model, the cold start model trained to output personalized data for a third service;
   receiving consent from a user to access first user data associated with the first service;
   obtaining at least a portion of the first user data of the first service associated with the user;
   determining that the user has not provided consent for use of second user data associated with the second service;
   creating substitute data that includes second null values for the second user data in response to the user having not provided consent for use of the second user data;
   generating features for the cold start model using the first user data and the substitute data;
   generating cached personalized data for the third service for the user by deploying the trained cold start model input with the features;
   receiving a request from the user for initial access to the third service;
   verifying that the consent has not been revoked; and
   providing at least some of the cached personalized data for the third service to the user in response to the request when the consent has not been revoked.

2. The method of claim 1, further comprising:
   obtaining consent from the user to use the second user data;
   generating updated features for the cold start model using the first user data and the second user data;
   generating updated cached personalized data for the third service for the user using the cold start model input with the updated features;
   receiving a subsequent request from the user to access the third service; and
   providing the updated cached personalized data to the user in response to the subsequent request.

3. The method of claim 1, wherein:
   the first service captures first user interaction with a digital catalogue of items;
   the second service captures second user playback of content; and
   the cached personalized data includes a selection of titles for consumption by the user from at least one of music, books, podcasts, or videos.

4. The method of claim 1, further comprising:
   presenting at least a portion of the cached personalized data to the user in a user interface based at least in part on a preference of the user associated with the first user data.

5. The method of claim 1, wherein the cached personalized data includes a plurality of titles of content, and further comprising:
   selecting a first subset of the plurality of titles of content for presentation to the user at a first time; and
   selecting a second subset of the plurality of titles of content for presentation to the user at a second time after presentation of the first subset at the first time.

6. A computer-implemented method, comprising:
   receiving first consent from a user to access first user data associated with a first service;
   obtaining at least some of the first user data of the first service associated with the user;
   determining that the user has not provided second consent for use of second user data associated with a second service or does not have the second user data;
   creating substitute data for use in place of the second user data;
   generating features for a content model using the first user data and the substitute data;
   generating cached personalized data for a third service for the user by processing the features with the content model trained to provide personalized data for the third service based on at least training data associated with the first service and the second service; and providing at least some of the cached personalized data for the third service to the user in response to user access of the third service.

7. The computer-implemented method of claim 6, further comprising:

associating the user with one or more other users that have provided consent for use of the second user data associated with the second service;

obtaining group data derived from the second user data from the one or more other users; and wherein the substitute data includes the group data.

8. The computer-implemented method of claim 6, further comprising:

generating a customized layout for presentation of the at least a portion of the cached personalized data based at least in part on the first user data.

9. The computer-implemented method of claim 6, further comprising:

generating a request for consent from the user for access to the second user data;

obtaining consent from the user to use the second user data;

generating updated features for the content model using the first user data and the second user data; and generating updated cached personalized data for the third service for the user using the content model with the updated features.

10. The computer-implemented method of claim 6, wherein the cached personalized data includes a selection of titles of content configured for playback by the user.

11. The computer-implemented method of claim 6, wherein the creating the substitute data includes creating null data for use in place of the second user data.

12. The computer-implemented method of claim 6, wherein the first service, the second service, and the third service are controlled by or affiliated with at least one common entity.

13. The computer-implemented method of claim 6, further comprising:

training the content model with at least some data from the first service, the second service, or both, and wherein at least some data is replaced with substitute values.

14. The computer-implemented method of claim 6, further comprising:

updating the cached personalized data after at least one of a predetermined threshold amount of time, receipt of the second consent from the user for the second service, or an update to the content model.

15. A system, comprising:

one or more processors; and a memory storing program instructions that when executed by the one or more processors cause the one or more processors to at least:

receive first consent from a user to access first user data associated with a first service;

obtain at least a portion of the first user data of the first service associated with the user;

determine that the user has not provided second consent for use of second user data associated with a second service or does not have the second user data;

create substitute data for the second user data;

generate features for a content model using the first user data and the substitute data;

generate cached personalized data for a third service for the user by processing the features with the content model, the cached personalized data being different than personalized data generated for a different user based at least in part on the features; and provide at least some of the cached personalized data for the third service to the user in response to user access of the third service.

16. The system of claim 15, wherein:

the content model is trained by replacing at least some training data with null values, and the substitute data includes at least some null values.

17. The system of claim 15, wherein the program instructions that when executed by the one or more processors further cause the one or more processors to at least:

generate a customized layout for presentation of the at least a portion of the cached personalized data based at least in part on the first user data.

18. The system of claim 15, wherein the program instructions that when executed by the one or more processors further cause the one or more processors to at least:

receive a request from the user to join the third service; and select a portion of the cached personalized data for presentation to the user via the third service.

19. The system of claim 15, wherein the program instructions that when executed by the one or more processors further cause the one or more processors to at least:

verify that the first consent has not been revoked prior to the user access of the third device before providing the at least some of the cached personalized data for the third service to the user.

20. The system of claim 15, wherein the program instructions that when executed by the one or more processors further cause the one or more processors to at least:

generate a request for consent from the user for access to the second user data;

obtain consent from the user to use the second user data;

generate updated features for the model using the first user data and the second user data; and generate updated cached personalized data for the third service for the user using the content model with the updated features.

* * * * *